United States Patent
Sharma et al.

(10) Patent No.: US 11,789,852 B2
(45) Date of Patent: Oct. 17, 2023

(54) GENERATING TEST ACCOUNTS IN A CODE-TESTING ENVIRONMENT

(71) Applicant: Capital One Services, LLC, McLean, VA (US)

(72) Inventors: Neeraj Sharma, Glen Allen, VA (US); Jeffrey A. Tyree, Powhatan, VA (US); Andrew Troy Hartwell, Prosper, TX (US); Siwatm Piyasirisilp, Herndon, VA (US); Suresh Vadigi, Kennett Square, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/079,758

(22) Filed: Oct. 26, 2020

(65) Prior Publication Data

US 2022/0129369 A1    Apr. 28, 2022

(51) Int. Cl.
*G06F 11/36* (2006.01)
*G06F 21/62* (2013.01)

(52) U.S. Cl.
CPC .......... *G06F 11/3672* (2013.01); *G06F 21/62* (2013.01); *G06F 21/6254* (2013.01)

(58) Field of Classification Search
CPC ... G06F 11/3672; G06F 21/62; G06F 21/6254
See application file for complete search history.

(56) References Cited

U.S. PATENT DOCUMENTS

| 6,163,805 A | * | 12/2000 | Silva | G06F 11/3664 709/227 |
|---|---|---|---|---|
| 8,117,219 B2 | | 2/2012 | Dunki et al. | |
| 8,566,286 B1 | * | 10/2013 | Hawton | G06F 11/1458 707/654 |
| 8,904,239 B2 | | 12/2014 | Seren et al. | |
| 9,529,699 B2 | | 12/2016 | Rajan et al. | |
| 10,083,110 B2 | | 9/2018 | Kaser et al. | |

(Continued)

OTHER PUBLICATIONS

R. Siblini et al. "Testing Web Services," 2005 [retrieved on Feb. 21, 2023], 3rd ACS/IEEE International Conference on Computer Systems and Applications, pp. 1-8, downloaded from <url>:https://ieeexplore.ieee.org. (Year: 2005).*

(Continued)

*Primary Examiner* — Thuy Dao
*Assistant Examiner* — Stephen D Berman
(74) *Attorney, Agent, or Firm* — Sterne, Kessler, Goldstein & Fox P.L.L.C.

(57) ABSTRACT

Systems, media, and methods for automatically generating test accounts using a test account generator are disclosed. Responsive to an indication of a selection of a product of interest from among a list of products, fields of information corresponding to the selected product, as well as enabling the testing of the test account, are generated. Permission to access a plurality of servers containing data corresponding to the fields of information is requested. Responsive to permissions to access the plurality of servers being granted, a test data set including data corresponding to the fields of information is produced and transmitted to the test account generator. Upon receiving the test data set, the included data is populated into corresponding fields of information to generate the test account.

17 Claims, 5 Drawing Sheets

(56) References Cited

U.S. PATENT DOCUMENTS

| | | | |
|---|---|---|---|
| 10,178,045 B2 | 1/2019 | Kumar | |
| 10,210,074 B1* | 2/2019 | Szerenyi | G06F 11/3688 |
| 10,235,676 B2 | 3/2019 | Choe et al. | |
| 10,437,712 B1 | 10/2019 | Tyler et al. | |
| 10,489,864 B1* | 11/2019 | Werr | G06Q 20/4016 |
| 10,540,259 B1 | 1/2020 | Kramer et al. | |
| 11,550,565 B1 | 1/2023 | VanAntwerp et al. | |
| 2008/0086499 A1 | 4/2008 | Wefers et al. | |
| 2013/0054792 A1* | 2/2013 | Sharaf | G06F 11/3688 709/224 |
| 2013/0263098 A1* | 10/2013 | Duda | G06F 11/3664 717/134 |
| 2014/0047342 A1 | 2/2014 | Breternitz et al. | |
| 2014/0082593 A1* | 3/2014 | Alper | G06F 11/3672 717/126 |
| 2014/0109055 A1 | 4/2014 | Gibbens et al. | |
| 2014/0181042 A1* | 6/2014 | Toyama | G06F 11/1451 707/652 |
| 2016/0085663 A1 | 3/2016 | Best | |
| 2016/0124742 A1 | 5/2016 | Rangasamy et al. | |
| 2017/0023920 A1 | 1/2017 | Pawlus et al. | |
| 2017/0038919 A1 | 2/2017 | Moss et al. | |
| 2017/0277627 A1 | 9/2017 | Ellis et al. | |
| 2017/0286265 A1* | 10/2017 | Moth | G06F 11/3644 |
| 2017/0364434 A1 | 12/2017 | Kairali et al. | |
| 2018/0039565 A1 | 2/2018 | Rajagopalan et al. | |
| 2018/0181378 A1 | 6/2018 | Bakman | |
| 2019/0065353 A1 | 2/2019 | Tammariello et al. | |
| 2019/0095258 A1 | 3/2019 | Chandrasekaran | |
| 2019/0095320 A1* | 3/2019 | Biswas | G06F 21/577 |
| 2019/0220305 A1 | 7/2019 | Festa et al. | |
| 2019/0294519 A1 | 9/2019 | Garg et al. | |
| 2019/0324897 A1 | 10/2019 | Subramanian et al. | |
| 2019/0333069 A1 | 10/2019 | Noble et al. | |
| 2020/0089599 A1 | 3/2020 | Hegarty et al. | |
| 2020/0159653 A1* | 5/2020 | Raghupathy | G06F 11/3688 |
| 2020/0250074 A1 | 8/2020 | Zhang et al. | |
| 2020/0287982 A1 | 9/2020 | Dinh et al. | |
| 2020/0320557 A1* | 10/2020 | Fuchs | G06F 11/3672 |
| 2020/0396225 A1 | 12/2020 | Bhatia et al. | |
| 2021/0072965 A1 | 3/2021 | Masters et al. | |
| 2021/0096979 A1* | 4/2021 | Fasheh | G06K 7/10366 |
| 2021/0141712 A1 | 5/2021 | Gevorkyan et al. | |
| 2021/0240551 A1 | 8/2021 | Joyce et al. | |
| 2021/0264805 A1* | 8/2021 | Delaney | G06F 21/62 |
| 2021/0279047 A1 | 9/2021 | McLaren | |
| 2021/0294732 A1 | 9/2021 | Underseth | |
| 2021/0390011 A1* | 12/2021 | Cser | G06F 11/3684 |
| 2022/0100649 A1 | 3/2022 | Ponitsch et al. | |

OTHER PUBLICATIONS

Dong Qiu et al., "Regression Testing of Web Service: A Systematic Mapping Study," 2014 [retrieved on May 19, 2023], ACM Computing Surveys, vol. 47, Issue 2, Article No. 21, pp. 1-46, downloaded from <url>:https://dl.acm.org. (Year: 2014).*

* cited by examiner

GENERATING TEST ACCOUNTS IN A CODE-TESTING ENVIRONMENT

BACKGROUND

When creating or updating features for web sites and applications, developers have a number of tools to make and implement changes at their disposal. In fact, the tools involved in this work are themselves constantly being improved. While the work to build these features can at times be difficult, creation is merely the first step in the process. Testing is also an integral component in these code-developing efforts.

During this part of the cycle, developers will use artificial or dummy accounts to gauge the effects of the changes under test. Often times that use will be not for just a single test account, but for a number of fictitious yet realistic accounts that present a wide variety of scenarios and situations to test the real-world functioning of the site/application. The tasks of those working to develop key technology for financial services are no different, as new or improved features should be thoroughly vetted in a testing environment prior to deployment in live use.

Developers for financial services institutions like banks and other credit providers face additional challenges due to the difficulty of producing test accounts. Privacy regulations in many jurisdictions prevent the use of live customer data. Rather than simply re-purposing or rearranging actual customer records, additional safeguards may be implemented in order to create test accounts. Because of this, requesting test accounts and simulation data can, in and of itself, become a complicated process. There can be multiple and varied requests to place, a number of data stores to access, and several permissions to grant in order to complete just one request for a test account, much less requests for a volume of them.

For at least these reasons, what is needed are improved testing systems usable in highly regulated environments.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features, but alternative orientations or arrangements can be possible within the scope of the present application.

DETAILED DESCRIPTION

Figure 1:
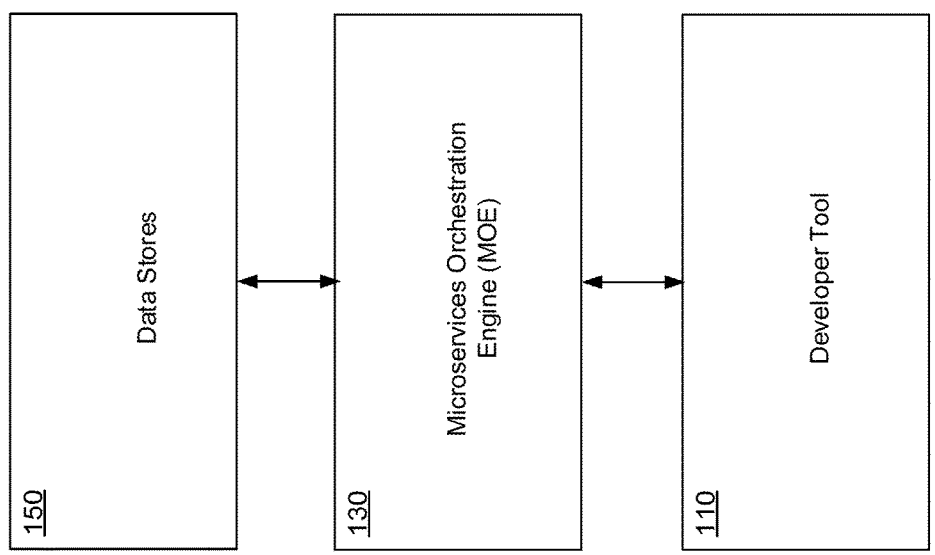
FIG. 1 is high-level block diagram of a system for generating test accounts, according to an embodiment of the disclosure.

Embodiments of the present disclosure are directed to methods, media, and systems for automatically generating test accounts in a code-testing or non-production environment. The testing process is improved, because the test accounts can be requested based on the development features or a set of test conditions, without the developer delving deep into the specifics of the request to generate the test account. Such improvements also speed the development and testing process overall, due to a more streamlined request timeline.

Generating the test account includes populating data into a corresponding field of information of a test data set. The data populated into the fields of information included in the test data set may be retrieved from disparate data stores. Subsequently, a test account is generated from the test data set, and testing is performed on/using the test account. Data used to generate the test account can be synthetic data (also referred to synonymously as artificial data or non-production data), which can be dynamically updated throughout the test account generation and/or testing processes.

The components and/or architectural elements described below can be employed in an overall software development system to aid developers across a range of activities. These and other embodiments can be particularly useful for a financial institution such as a bank, credit union, or credit card provider. As a single source of developer tools, various applications can be used within the environment to overcome challenges specific to the industry.

The combination of regulatory and technical complications associated with the security of information for financial institutions creates a unique set of challenges that this system addresses. Primary among those impediments are the complexity of the constituent pieces involved, the interconnected nature of the sub-systems and processes, and the specificity of each. To meet and overcome those hurdles, the disclosed system reduces the burden placed on a developer with respect to required background knowledge. The described sub-systems, elements and tools also work together (with the aid of "METHODS, SYSTEMS, AND MEDIA FOR A MICROSERVICES ORCHESTRATION ENGINE", U.S. patent application Ser. No. 17/079,763, incorporated by reference herein in its entirety) to provide interconnected solutions across the development life cycle.

Starting with the business processes that underly each of the phases that a developer must address, the overall development architecture disclosed in this application can be used to guide a software innovation in the financial services field from start to finish. Once business processes are identified (with or without the use of the specific tools of this system, such as found in "METHODS, SYSTEMS, AND MEDIA FOR GENERATING AN UPDATED WORKFLOW FOR AN OPERATION EXECUTABLE BY A COMPUTING DEVICE", U.S. patent application Ser. No. 17/079,767, incorporated by reference herein in its entirety), the software development environment can be used to create test users and accounts (as in the application disclosed herein). A developer can further test users and accounts through each phase of a variety of transactions expected of those users/accounts, and even test processes with outside vendors and third parties which previously had no means for testing (found in "METHODS, SYSTEMS, AND MEDIA FOR GENERATING TEST AUTHORIZATION FOR FINANCIAL TRANSACTIONS", U.S. patent application Ser. No. 17/183,598, incorporated by reference herein in its entirety and "METHODS, SYSTEMS, AND MEDIA FOR ACCESSING DATA FROM A SETTLEMENT FILE", U.S. patent application Ser. No. 17/183,579, incorporated by reference herein in its entirety).

The phase-by-phase analysis of code under development can also be used to test recurring transactions, interconnected transactions (e.g., authorization and settlement), or produce negative testing/edge testing scenarios of a completely hypothetical nature. The ability to connect the various processes can allow a developer to probe the interactions that occur due to changes in existing products and services, as well as explore the performance of code for new products and services. The architecture and implementation of the disclosed systems have been created in such a way as to also provide "cascading" updates. The level of abstraction within the disclosed framework ensures that changes made at one point in the system are reflecting in related processes elsewhere in the development architecture (e.g., alterations made in generating test accounts that should affect other testing tools are updated in those other applications).

Many of the examples provided below will be drawn from the financial services space because of the regulatory protections in place, which constitute burdens on developers in modifying or generating test accounts. As an example, a developer could request 25 test accounts with a particular minimum FICO score (e.g., 750 or greater) to act as accurate analogs of how these accounts behave during credit card approval processes with a bank. Once generated, test accounts can be subjected to testing scenarios for other processes, such as authorization or settlement testing.

While this and below examples have been used, any area of technology facing heavy privacy regulation or complicated technical request schemes will be also be improved by the above and below. For instance, legal or fiduciary organizations, educational institutions, or medical practitioners/ entities can experience regulatory hurdles because of the safeguards that are in place with respect to data collection, use, disclosure and/or exposure. Even those developers without specialized knowledge in the applicable regulatory schemes can avoid these hurdles using the disclosed systems, methods and media.

Additionally, technical issues can arise from these regulations or other related processes, because of the complex interconnections of disparate computing systems or partitioned data/service delivery implemented to avoid violations. Timing dependent on complicated structures passing multiple variables across varied protocols can also create technical challenges. Accordingly, the outcome-based approach of the embodiments will also open the development process to more programmers, who will only use knowledge of their own code to continue. The improved non-production account generation eliminates use of background knowledge of the underlying request processes or technical intricacies involved.

The test accounts described above and below are populated from data that has been automatically or electronically pulled from various external data stores. This may include data available through the use of microservices and/or third-party data sources/data vendors. As an additional benefit of this approach, access to permissions that may raise privacy concerns are handled automatically, increasing safety. This bypassing of developer checks due to a requestor-agnostic test data set also provides an added benefit of increased speed in the development cycle.

FIG. 1 is a high-level block diagram of a system 100 for generating test accounts, in accordance with embodiments of the present disclosure. Test account generation system 100 includes developer tool 110, microservices orchestration engine (MOE) 130, and data store(s) 150. In examples, data stores 150 can include microservice components and/or any data associated with those microservices. Data stores 150 can include a plurality of servers, which in accordance with embodiments of the present disclosure, may be local servers, disparate servers, or a combination thereof. As shown in FIG. 1, developer tool 110 is configured to communicate with MOE 130, and MOE 130 is configured to communicate with data stores 150.

Developer tool 110 includes a test account generator for generating test accounts. The test account generator of developer tool 110 further includes various fields of information, which are used in the test account generation process. Developer tool 110 is configured to transmit to MOE 130 fields of information used in the request to create one or more test accounts or that are part of the test accounts themselves. As an example, if the request is for a quantity of test accounts, each having specified products or parameters, each aspect of that request will be included in the fields of information.

Developer tool 110 is also configured to request permission to access data stores 150. The data stores 150 contain data corresponding to at least a portion of the fields of information. Responsive to the permissions being granted, data stores 150 transmit a data set to MOE 130, the data set including data corresponding to the fields of information. The data set can include data that is artificially generated to replicate statistical components of real-world data that has already been stripped of all privacy-protected information (or otherwise anonymized). In embodiments, the data set may be at least partially synthetic.

In some examples, before being obtained, the synthetic data set may have been made devoid of any privacy-protected information, such as personally identifiable information (PII). Alternatively, before being obtained, the data set may have been anonymized through mixing of any PII among members of the data set. For institutions generating these test accounts internally, the institution can create its own data sets by stripping and/or anonymizing user data. In other examples, institutions can obtain permission to access and retrieve synthetic data from the data stores of third parties. In further other examples, mixtures of internal and external data provided by a plurality of data stores/sources can be requested by developer tool 110 from data stores 150 by way of MOE 130.

Responsive to receiving the completed data set, MOE 130 is configured to forward the data corresponding to the fields of information to the appropriate fields of information of the test account, thereby aiding in test account generation/ completion. In embodiments, test accounts generated can be tested in a non-production environment. Examples of a non-production environment can include a code-testing environment or a quality assurance (QA) environment. Data stores 150 can belong to, or otherwise be affiliated with, an institution implementing developer tool 110 (i.e., an internal data store). Alternatively, data stores 150 can belong to, or otherwise be affiliated with, external third parties outside of the institution implementing developer tool 110 (i.e., an external data store). Examples of third parties to whom data stores 150 may belong or with whom data stores 150 may otherwise be affiliated include credit bureaus, credit reporting agencies, medical facilities, and/or educational institutions.

Various communications protocols enable communications between development tool 110, MOE 130, and data stores 150. The same or different protocols can enable requests between development tool 110 and MOE 130 as those that also enable the access requests between MOE 130 and data stores 150. The protocols can include, but are not limited to, calls to databases, mainframes, and application programming interfaces (APIs), as well as calls between cloud services and cloud files, schedulers and scheduler calls, and/or other suitable means of communicating between the various components. Furthermore, the test accounts can be constructed through a combination of Simple Object Access Protocol (SOAP) service calls, Oracle and/or SQL database calls, calls to miscellaneous databases, database (DB) gateway calls, Representational state transfer (RESTful) application programming interface (API) calls, T-SYS mainframe emulator communications, third-party data source communications, cloud services files, and/or scheduler calls.

As an example, a developer using developer tool 110 can create code for a feature which leads to a request for 10 test accounts. Based on the feature under development or simply the development preferences of the developer, the test accounts will be specified as each having a checking account with a particular minimum balance. The requested test accounts can also be specified as each having at least one credit card with a particular range of credit limits.

Each aspect of that request may be included in the fields of information transmitted from developer tool 110 to MOE 130 and eventually from MOE 130 to data stores 150. Based on the request, data stores 150 may provide the requisite information back to MOE 130, which will in turn be transmitted to developer tool 110 in the form of the 10 requested test accounts. Through the entire process, developer awareness can be reduced to the high-level parameters of the test accounts, without delving into the specifics of the requests, permissions, formatting or the like.

As another example, a developer using developer tool 110 can create code for a feature which is best tested in a band of credit scores (e.g., for high-scoring customers, low-scoring customers, some range near an average score, etc.). The feature can lead to a request for 50 test accounts having a FICO score of 750 or better. Once again, the corresponding requests can be communicated from developer tool 110 to MOE 130 to data stores 150, and eventually back to developer tool 110 by way of MOE 130. The developer will simply receive the test accounts that enable testing of the code under development, without requesting aspects of the test accounts specifically.

Figure 2:
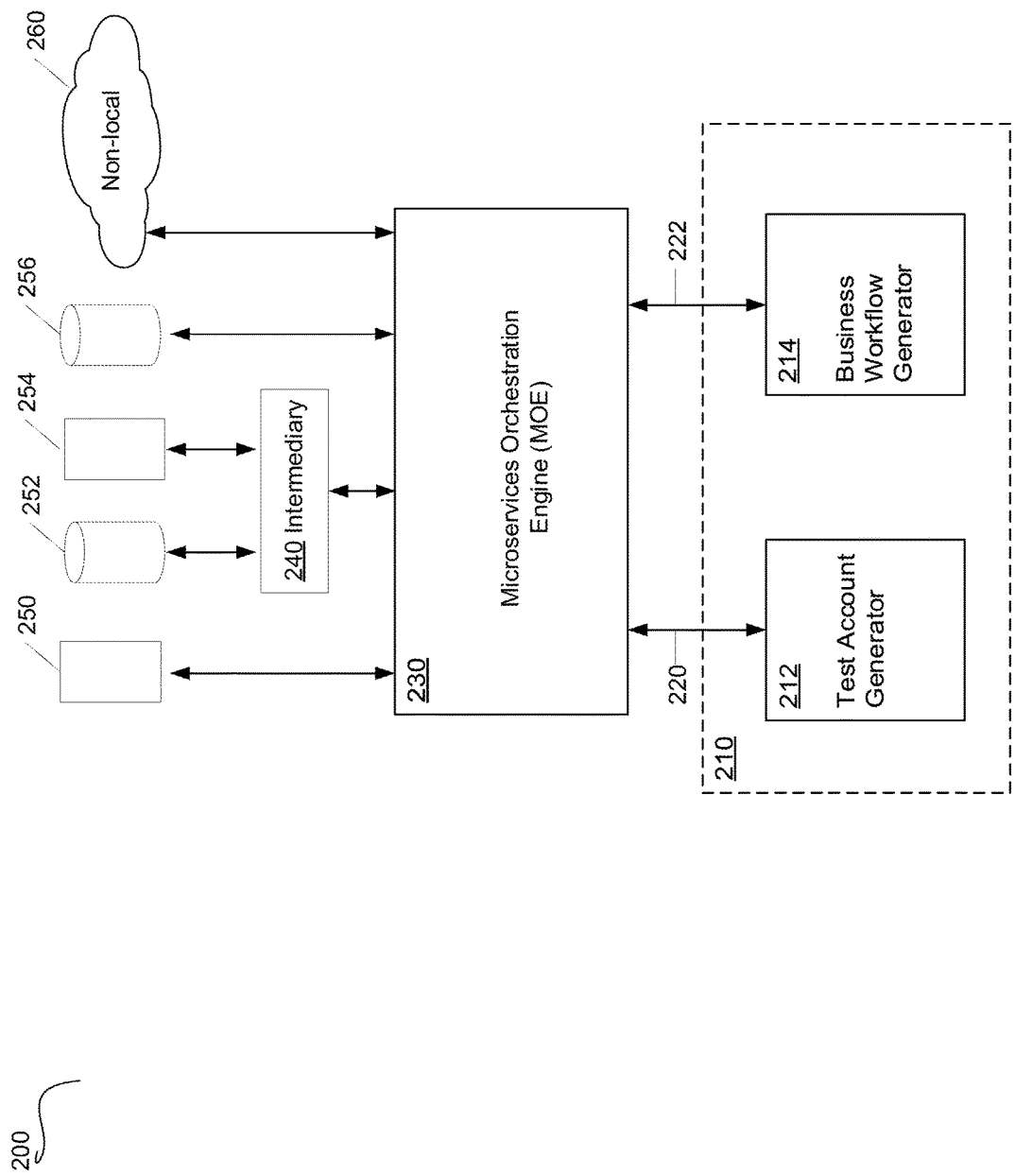
FIG. 2 is system-level diagram of a test account generator in a code-testing environment, according to an embodiment of the disclosure.

FIG. 2 illustrates a system 200 for generating test accounts in a code-testing environment. System 200 is consistent with the system depicted in FIG. 1 and provides additional details of certain components in accordance with embodiments of the present disclosure. Included in system 200 are developer tool 210, microservices orchestration engine (MOE) 230, intermediary 240, microservices and storage 250, 252, 254, and 256 (collectively referred to as 'the microservices 25X'), and non-local data stores 260.

As shown in FIG. 2, developer tool 210 can include test account generator 212 and business workflow generator 214 (which is discussed in further detail in U.S. patent application Ser. No. 17/079,767, incorporated by reference herein in its entirety). MOE 230 can be configured to communicate with test account generator 212 and business workflow generator 214, through two-way communications 220 and 222, respectively. Developer tool 210 and business workflow generator 214 can interact with MOE 230 through protocols, means or components that are either consistent or entirely different.

Responsive to test account generator 212 obtaining the permissions (through a permissions generator to be described in more detail with respect to FIG. 3 below), test account generator 212 is configured to communicate with MOE 230 by way of communication 220. More specifically, test account generator 212 enables a selection of a product of interest from among a selection of products offered (e.g., a credit account by an institution) to be examined by a developer operating in the code-testing environment (i.e., by use of developer tool 210). Furthermore, selection of the product of interest indicates which fields of information are to be included in the generated test account. The indicated fields of information are then transmitted from test account generator 212 to MOE 230.

Responsive to receiving permission (from the microservices 25X and/or non-local data stores 260) to access data corresponding to the indicated fields of information indicated by test account generator 212, the information for a test data set is received by MOE 230. Data corresponding to the indicated fields of information is populated into the appropriate fields of information to generate test accounts. The generated test accounts are then subjected to testing in the code-testing environment.

In embodiments, a developer for a financial institution can use system 200 to generate a specified number of test accounts in a code-testing environment. Using the test account generator 212, an indication is given of what type of line of credit from among a selection of lines of credit offered by the institution is of interest. For instance, a developer may indicate interest in a credit card from among the selection of lines of credit offered by a financial institution. The selection of lines of credit offered by the financial institution can also include an auto loan, a personal loan, a student loan, or a mortgage. In some examples, indication of the line of credit of interest is made through a user interface, such as a monitor or other display device, a mouse, a keyboard, a touch-sensitive display, a trackpad, a signature pad, or any other suitable user interface device and/or combination thereof.

Responsive to the indication of the line of credit of interest, a list of fields of information corresponding to the line of credit of interest is created and sent to MOE 230 by way of communication 220. Examples of the fields of information may include privacy-protected information such as a name, mailing address, social security, or annual income, among other pieces of PII. Permission to access the microservices 25X and/or non-local data stores 260 to retrieve data corresponding to the fields of information is requested by test account generator 212.

Responsive to permission being granted, the microservices 25X and/or non-local data stores 260 send the requested information to MOE 230. Microservices 25X can include any one or group of servers, SQL databases, Oracle databases, other databases, gateways, cloud files, schedulers, or other components for microservice completion. Information exchanged between MOE 230 and the microservices 25X and the non-local data stores 260 may pass through an intermediary 240. Examples of an intermediary 240 can include any number or variety of mainframes or frameworks, as well as emulators of the same.

Responsive to receipt of the requested information by MOE 230, the information is then forwarded to test account generator 212 through communication 222. Test account generator 212 populates data for the fields of information in the test account to complete generation of the same. Once generated, the test account (effectively an analog for a live account in a production environment) is tested for performance in the code-testing environment.

As one example, a developer can be interested in updating a web-based application process or a portion thereof. The generated test account(s) can be tested against various approval criteria designated by the financial institution so as to assess the internal processes for the generated test account (a fictitious "applicant"). As part of the test process, whether or not the proper variable values are passed through the code under test can be verified. Alternatively, the interaction of variables in more complex systems can be checked. Furthermore, the test account may be subjected to the same set of testing multiple times, or may be subjected to multiple different tests run by the financial institution to help ensure the accuracy of its approval process(es).

For instance, as part of an application for a particular credit card offering, the developer may want to marry information between existing account(s) and the credit card application. The developer may want to eliminate the previously required entry of the account number. As an improvement, the developer instead wants to allow entry of either of the account number or a debit card associated with the account number. The checking/savings account(s) also are understood to have one or more debit card numbers associated with them.

Following this example, the test account(s) generated have a checking or savings account component (account number), along with a fabricated debit card number associated with that account. Moreover, the developer can order 20 test accounts, all having either a checking or a savings account with a debit number, simply by entering basic information to be assumed. The test account generator can then perform all of the backend processes to generate these accounts, including the data sources from which the information is queried, the permissions to access that data, and the compilation of the accessed data.

Once generated, the developer can check properties of the application process, such as whether the correct values are processed against both the account number and the debit card number. Any discrepancies can be scrutinized in detail, across a number of test accounts. Various permutations and modifications can be made to test across multiple scenarios. Later processes such as transaction authorization and/or account settlement can be tested using other aspects of the overall testing system (which is discussed in further detail in U.S. patent application Ser. No. 17/183,598, incorporated by reference herein in its entirety, and which is discussed in further detail in U.S. patent application Ser. No. 17/183,579, incorporated by reference herein in its entirety). All of the testing, however, can take place more quickly and more thoroughly because of the ease of test account generation at the onset.

Figure 3:
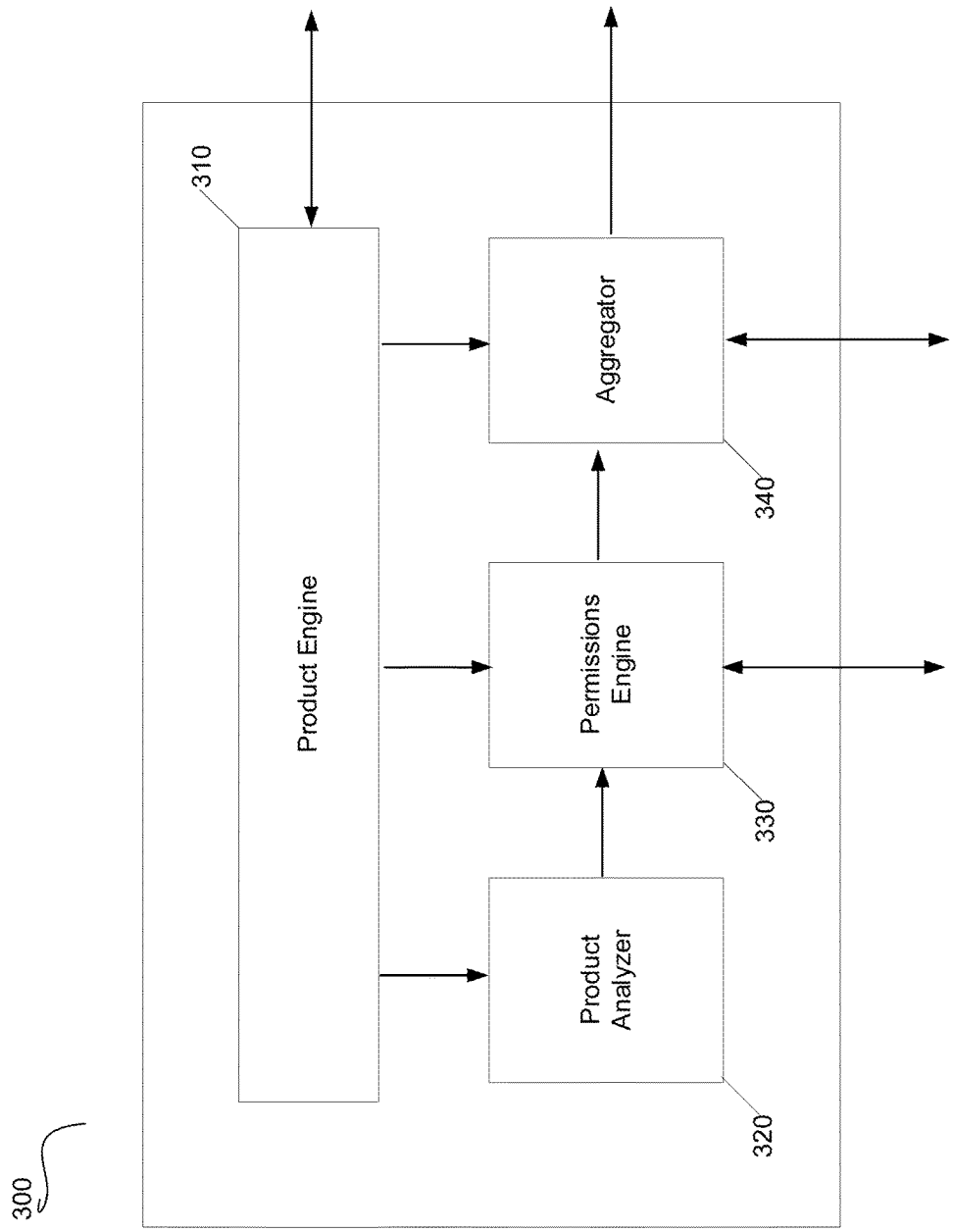
FIG. 3 is a block diagram of a test account generator according to an embodiment of the disclosure.

FIG. 3 is a block diagram of test account generator 300, depicting the test account generator 212 illustrated in FIG. 2 in greater detail and in accordance with embodiments of the present application. Test account generator 300 includes a product engine 310, a product analyzer 320, a permissions engine 330, and an aggregator 340. While a specific configuration is shown in FIG. 3, those skilled in the relevant arts will recognize that alternatives may be contemplated that does not depart in scope from the present application.

Product engine 310 is shown configured to transmit data to product analyzer 320, permissions engine 330, and aggregator 340. Product engine 310 is also configured to transmit and receive communications with additional components external to test account generator 300 (e.g., MOE 130 described above and below). Product engine 310 is configured to display, via a user interface not shown, a selection of products offered by an institution. Through the same user interface, a product of interest from among the selection of products offered by the institution can be selected. Product engine 310 is configured to transmit selection of a product of interest, or a reference to the selection, to each of product analyzer 320, permissions generator 330, and aggregator 340.

Product analyzer 320 is configured to receive the selection of a product of interest from product engine 310. Product analyzer 320 is configurable to determine fields of information which enable testing of code related to the selected product of interest, such as through details, stored in a data base or other storage medium, describing each of the potential products of interest. Responsive to receiving the selection of a product of interest from product engine 310, product analyzer 320 is configured to send an enabling list of fields of information to permissions generator 330.

Responsive to receiving the enabling list of the fields of information from product analyzer 320 and the selection (either from product engine 310 directly or forwarded by product analyzer 320), permissions generator 330 is configured to request permissions to access data stores that are storing data corresponding to the enabling list. In some examples, the data stores having data corresponding to the enabling list can be data stores 150, 25X or, 260 discussed in the descriptions of FIGS. 1 and 2 above. Permissions generator 330 can be configured to communicate directly with MOE 130 as shown by the two-way communication arrow (not numbered) in FIG. 3. Alternatively, all of permission generator 330's two-way external communications can be handled by a separate input/output interface not depicted or described.

In some embodiments, permissions generator 330 is configured to request and receive permissions to access disparate data stores without regard to a user permission level corresponding to the requesting developer. For example, the developer can request and/or receive permission to access the data stores without having a super-user privilege, or any particular level of administrative authority. Additionally, permissions generator 330 may request and receive permission to access sensitive information stored on the disparate servers. Sensitive information may include privacy-protected consumer information such a personally identifiable information (PII) such as the examples of PII given above.

Responsive to receiving the selection, the enabling list, and the permissions, aggregator 340 is configured to generate a test account, based on an aggregated test data set. The test data set includes values retrieved from the data stores and corresponding to the enabling list of the fields of information. Aggregator 340 can be configured to communicate directly with MOE 130 as shown by the two-way communication arrow (not numbered) in FIG. 3. Alternatively, all of aggregator 340's two-way external communications can be handled by a separate input/output interface not depicted or described. Additional examples of components not included in test account generator 300 with which aggregator 340 can be configured to communicate with include intermediaries, microservices, and/or non-local data stores (e.g., servers, databases, mainframes and/or emulators) consistent with those discussed in the description of FIG. 2 above.

Aggregator 340 can be configured to transmit the test account to a computer-readable storage medium in a code-testing environment. Moreover, product engine 310, product analyzer 320, and aggregator 340 may be configured to permit dynamic access to the test data set and to permit dynamic updates to the test account responsive to receiving a request for dynamic changes to the test account. For instance, a developer can make modifications after the test account(s) are generated. Alternatively, the developer can request that the attributes of the test accounts change over time, so as to test the features through a dynamic range of values and behaviors. The test accounts can also be placed through various other test processes of the overall disclosed system, such as authorizations by an authorization generator or settlements through a settlement generator.

In embodiments, the test account generator 300 described above can be used by developers for a financial institution, while products offered can include various lines of credit, checking accounts, savings accounts, other forms of deposit accounts (e.g., certificates of deposit), and/or financial planning services. Examples of the lines of credit offered by the financial institution may include, but are not limited to, a credit card, an auto loan, a personal loan, a student loan, and/or a mortgage. In embodiments related to the present application, a developer may generate test accounts using a test account generator for use in a code-testing environment or an internal QA environment.

In embodiments, the code-testing or QA environment can be used to test one or more features used during the financial institution's processes to approve applicants seeking a new product. In such embodiments, the developer is presented, via a user interface, a list of the products offered by the financial institution. For instance, a developer can generate a set of test accounts for testing a new mobile application feature for approving mortgage applications for current customers of the institution.

Continuing with the above example, the developer can indicate, through the user interface, interest in checking accounts, savings accounts, credit cards and automobile loans to the product engine 310. Responsive to receiving the indications of interest in the above products, a list of fields of information enabling test accounts to be generated can be created by the product analyzer 320. Generated fields of information corresponding to selection of the credit card may include full name, mailing address, social security number, annual income, credit score, and various other pieces of PII.

Permissions generator 330 can then generate the permissions to access data stores corresponding to the aforementioned fields of information. Responsive to receiving the test data set, fields of information included in the test account are populated with the data included by the aggregator 340 to complete the test account. Once completed, the test account can be used to test the functionality of the application to ensure the developed code of the application functions properly.

In examples related to the above-described embodiments, the test account generator may be used for a mobile application feature to change credit card notification preferences. Alternative embodiments also include features such as profile information updates, display/UI preferences, banking preferences, requests to increase or decrease frequency of notifications, purchase alerts, account association, or the like. In additional embodiments, a business workflow generator (consistent with 214 of FIG. 2 as described above and discussed in further detail in U.S. patent application Ser. No. 17/079,767, incorporated by reference herein in its entirety) may enable the developer to condition the test accounts being generated according to other business procedures of the institution. For example, a business process that uses an additional notification step or a transaction adding extra layers of authentication can be tested.

Figure 4:
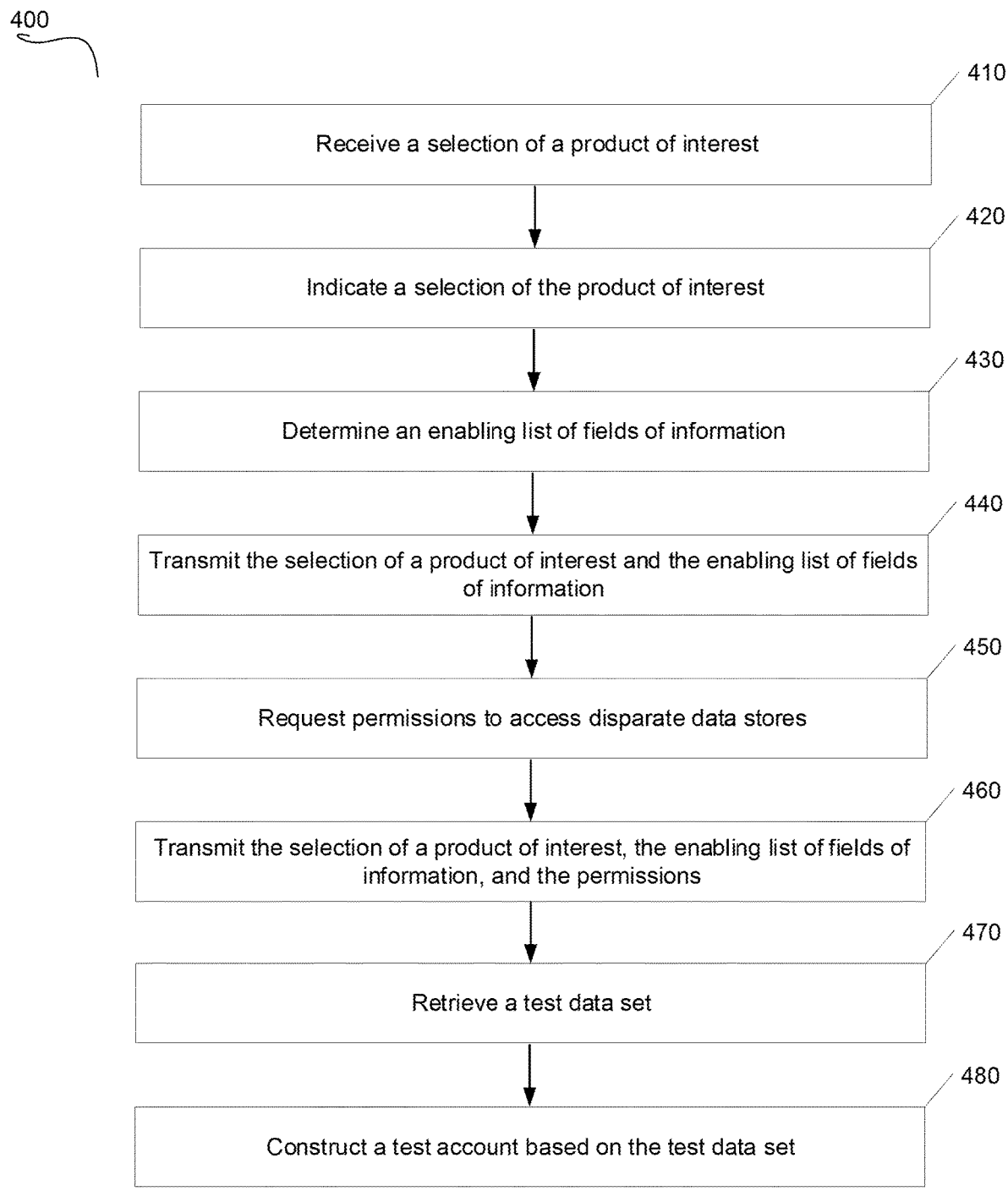
FIG. 4 is a flow chart describing a method of automatic test account generation, according to an embodiment of the disclosure.

Turning now to FIG. 4, a method 400 for automatically generating a test user account by a test account generator in a code-testing environment is depicted in accordance with embodiments of the present disclosure. At a step 410, a product engine (e.g., product engine 310 of FIG. 3) included in a test account generator receives a selection of a product of interest from among a selection of products offered. The list of products of offered by the institution may be presented via a user interface (e.g., a monitor or other display), and the selection of a product of a product of interest may be made through the user interface (e.g., a touch display) or other type of user interface (e.g., a mouse and/or keyboard). In embodiments, a combination of products can be associated with the generated account to test application functionality or underwriting decisions where the combination can affect outcomes.

Responsive to receiving the selection of a product of interest, a product analyzer (such as product analyzer 320 described above) indicates a selection of the product of interest at a step 420. Examples indicating a selection of the product of interest may include selecting a particular product from a drop-down list of products offered by an institution, checking a box next to any/all product(s) of interest from among the offerings of an institution, typing an indication of a product corresponding to a product(s) offered by an institution, and/or otherwise supplying adequate indicia of a product of interest offered by the institution. In some embodiments, a typed indication of a product may include exact words included in the name of the products, or keywords generally related to the product. While this may be entered manually, the selection is not so limited. Thus, automated selections or AI-enabled selections are consistent with the present application.

Responsive to indication of a product of interest, at step 430 the product analyzer determines and/or generates an enabling list of fields of information. The enabling list of fields of information enables generation of one or more test accounts for the selected product or products of interest. Additionally and/or alternatively, the enabling list of fields of information may include information stored on disparate servers related to the selected product of interest.

At a step 440, the selection of the product of interest and the enabling list of fields of information are transmitted to a permissions generator, such as permissions generator 330 described with respect to FIG. 3. Responsive to receiving the selection of the product of interest and the enabling list of fields of information, the permissions generator requests permissions to access disparate data stores at a step 450. Consistent with embodiments of the present disclosure, permissions may be requested and/or granted without regard to the level of administrative privilege or the permission level of the requestor.

The selection of the product of interest, the enabling list of fields of information, and the permissions are then transmitted at a step 460 to an aggregator (e.g., aggregator 340 of FIG. 3). The aggregator is configurable to retrieve a test data set from disparate data stores at a step 470. The test data set corresponds to the enabling list of fields of information. At a step 480, the aggregator then constructs the test account based on the test data set.

In examples within the scope of the present disclosure, the permissions allow for access to disparate data stores to retrieve the test data set, either internal or external to the overall system. In accordance with embodiments of the present application, information and permissions may be communicated between/among the components and sub-components (e.g., the test account generator, the product engine, etc.) in various forms. Examples of the requests transmitted and responses received to construct the test account include Simple Object Access protocol (SOAP) service calls, Oracle database calls, SQL database calls, miscellaneous database calls, database (DB) gateway calls, Representational state transfer (RESTful) application programming interface (API) calls, T-SYS mainframe emulator communications, third-party data source communications, cloud services files, and/or scheduler calls.

In embodiments related to the present disclosure, the product engine, product analyzer, permissions generator, and aggregator comprise one or more configurable computer-executable files. These configurable computer-executable files can be programmed in a programming language that is at least partially human-readable. Examples of such programming languages may include, but are not limited to Java Script Object Notation (JSON) files, Google Protocol Buffer (Protobuf) files, or extensible markup language (XML) files.

In additional embodiments related to the present disclosure, a computer-readable medium having a set of computer-executable instructions embodied thereon can be used to implement the above-noted elements and features. The computer-executable instructions when executed, can perform the steps of the method 400 for automatically generating a test user account. Likewise, such a computer-readable medium can perform the functions similar to the apparatuses and components disclosed above with respect to developer tool 110, developer 210 and/or test account generator 300.

Figure 5:
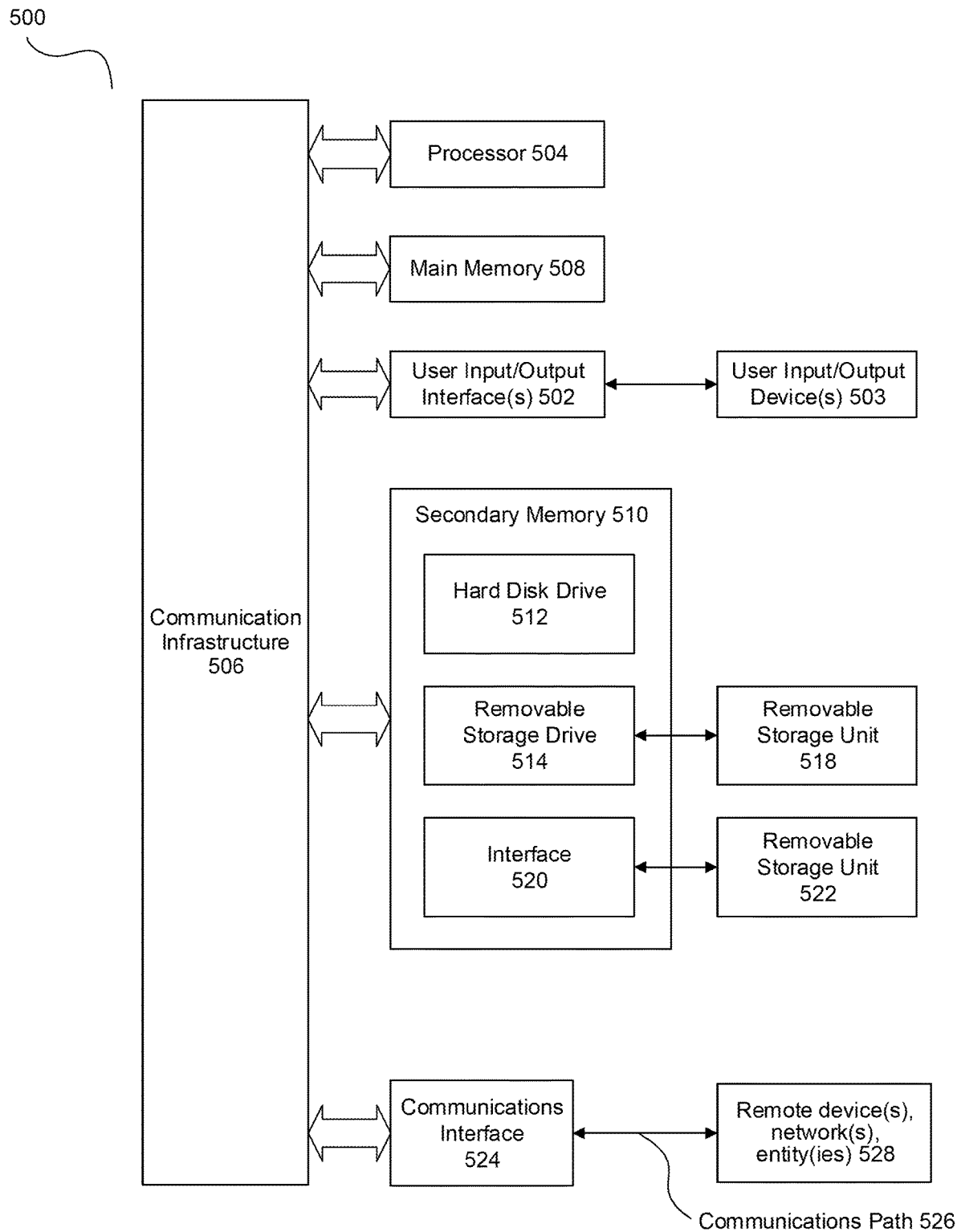
FIG. 5 is a computer system useful for implementing various embodiments.

FIG. 5 depicts an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data. Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

The invention claimed is:

1. A method for automatically generating a test user account, the method comprising:
receiving, by one or more computing devices, a selection of a product of interest from among a list of products offered;
determining, based on the selected product of interest, fields displayed via a user interface to be filled with information corresponding to portions of computer-executable code under test during a code-testing phase, the information stored in a distributed manner on a plurality of servers;
requesting one or more permissions to access the plurality of servers responsive to the selection, the one or more permissions granting access to the information corresponding to the portions of the computer-executable code and enabling the fields displayed via the user interface to be filled with portions of the information corresponding to the portions of the computer-executable code;
retrieving a test data set for the portions of the information corresponding to the portions of the computer-executable code under test; and
constructing a test account based on the test data set and at least in part on at least one of: Simple Object Access Protocol (SOAP) service calls, Representational state transfer (RESTful) application programming interface (API) calls, mainframe emulator communications, third-party data source communications, or scheduler calls.

2. The method of claim 1, further comprising receiving, based on the requesting the one or more permissions, permission to access the plurality of servers without regard to a permission level for the requesting the one or more permissions.

3. The method of claim 1, wherein the retrieving the test data set is responsive to an indication that the fields displayed via the user interface are filled with the portions of the information corresponding to the portions of the computer-executable code.

4. The method of claim 1, wherein a test result for the test account simulates a real-world functioning of the selected product of interest.

5. The method of claim 1, further comprising modifying at least a portion of the selected product of interest based on a test result of the test account.

6. A non-transitory computer-readable medium having instructions stored thereon that, when executed by at least one computing device, cause the at least one computing device to perform operations for automatically generating a test user account in a code-testing environment, the operations comprising:
receiving a selection of a product of interest from among a list of products offered;
determining, based on the selected product of interest, fields displayed via a user interface to be filled with information corresponding to portions of computer-executable code under test during a code-testing phase, the information stored in a distributed manner on a plurality of servers;
requesting one or more permissions to access the plurality of servers responsive to the selection, the one or more permissions granting access to the information corresponding to the portions of the computer-executable code and enabling the fields displayed via the user interface to be filled with portions of the information corresponding to the portions of the computer-executable code;
retrieving a test data set for the portions of the information corresponding to the portions of the computer-executable code under test; and
constructing a test account based on the test data set and at least in part on at least one of: Simple Object Access Protocol (SOAP) service calls, Representational state transfer (RESTful) application programming interface (API) calls, mainframe emulator communications, third-party data source communications, or scheduler calls.

7. The non-transitory computer-readable medium of claim 6, the operations further comprising receiving, based on the requesting the one or more permissions, permission to access the plurality of servers without regard to a permission level for the requesting the one or more permissions.

8. The non-transitory computer-readable medium of claim 6, wherein the retrieving the test data set is responsive to an indication that the fields displayed via the user interface are filled with the portions of the information corresponding to the portions of the computer-executable code.

9. The non-transitory computer-readable medium of claim 6, wherein a test result for the test account simulates a real-world functioning of the selected product of interest.

10. The non-transitory computer-readable medium of claim 6, the operations further comprising, testing, based on a test result of the test account, at least a portion of another product of interest.

11. The non-transitory computer-readable medium of claim 6, the operations further comprising modifying at least a portion of the selected product of interest based on a test result of the test account.

12. A test account generator comprising:
a memory storing operations; and
one or more processors configured to perform the operations, the operations comprising:
receiving a selection of a product of interest from among a list of products offered;
determining, based on the selected product of interest, fields displayed via a user interface to be filled with information corresponding to portions of computer-executable code under test during a code-testing phase, the information stored in a distributed manner on a plurality of servers;
requesting one or more permissions to access the plurality of servers responsive to the selection, the one or more permissions granting access to the information corresponding to the portions of the computer-executable code and enabling the fields displayed via the user interface to be filled with portions of the information corresponding to the portions of the computer-executable code;
retrieving, a test data set for the portions of the information corresponding to the portions of the computer-executable code under test; and
constructing a test account based on the test data set and at least in part on at least one of: Simple Object Access Protocol (SOAP) service calls, Representational state transfer (RESTful) application programming interface (API) calls, mainframe emulator communications, third-party data source communications, or scheduler calls.

13. The test account generator of claim 12, wherein the retrieving the test data set is responsive to an indication that the fields displayed via the user interface are filled with the portions of the information corresponding to the portions of the computer-executable code.

14. The test account generator of claim 12, the operations further comprising modifying at least a portion of the product of interest based on a test result of the test account.

15. The test account generator of claim 12, wherein the operations further comprise receiving, based on the requesting the one or more permissions, permission to access at least one of the plurality of servers without regard to a permission level for the requesting the one or more permissions.

16. The test account generator of claim 12, wherein a test result for the test account simulates a real-world functioning of the selected product of interest.

17. A system for generating test accounts, the system comprising:
a test account generation tool configured to automatically generate test accounts, the test account generation tool comprising:
a memory configured to store operations; and
one or more processors configured to perform the operations, the operations comprising:
receiving a selection of a product of interest from among a list of products offered;
determining, based on the selected product of interest, fields displayed via a user interface to be filled with information corresponding to portions of computer-executable code under test during a code-testing phase, the information stored in a distributed manner on a plurality of servers;
requesting one or more permissions to access the plurality of servers responsive to the selection, the one or more permissions granting access to the information corresponding to the portions of the computer-executable code and enabling the fields displayed via the user interface to be filled with portions of the information corresponding to the portions of the computer-executable code;
retrieving a test data set for the portions of the information corresponding to the portions of the computer-executable code under test; and
constructing a test account based on the test data set and at least in part on at least one of: Simple Object Access Protocol (SOAP) service calls, Representational state transfer (RESTful) application programming interface (API) calls, mainframe emulator communications, third-party data source communications, or scheduler calls; and
a workflow generator configured to generate the user interface, wherein the user interface enables configuration of the test account generation tool.

* * * * *